March 25, 1941.  G. E. WESTAD  2,236,025
CARRIER FOR SKIS AND SIMILAR ARTICLES
Filed Dec. 14, 1938
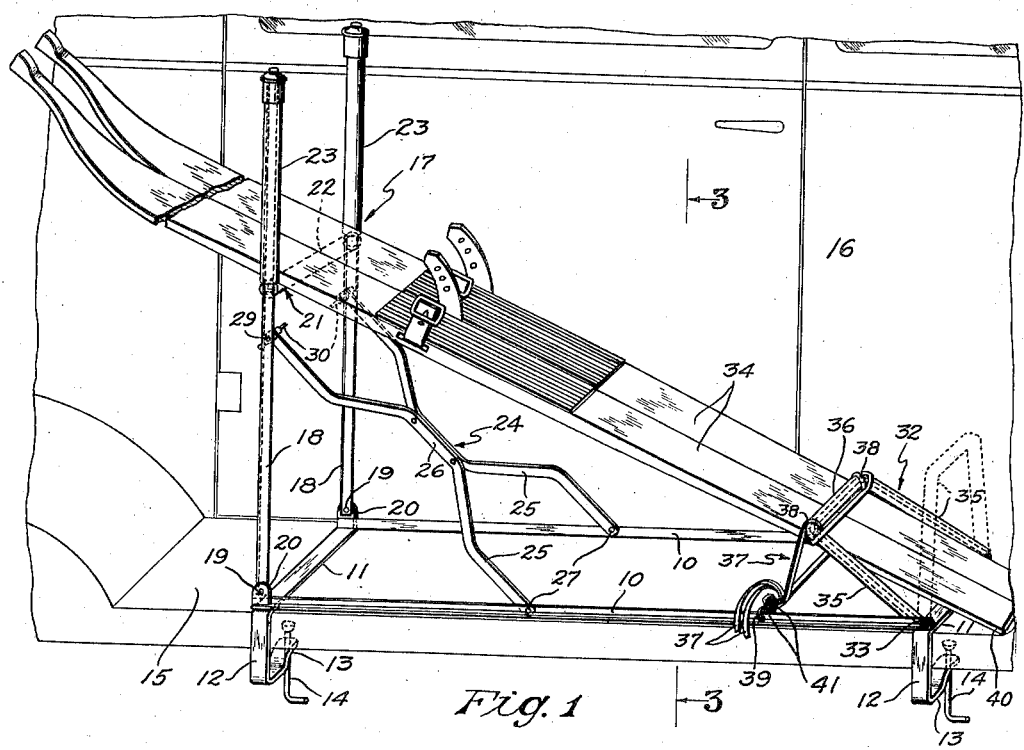
Fig. 1
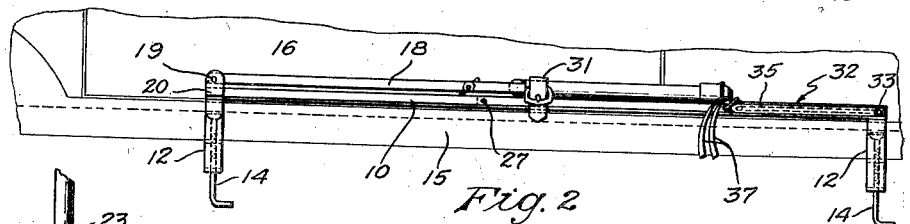
Fig. 2
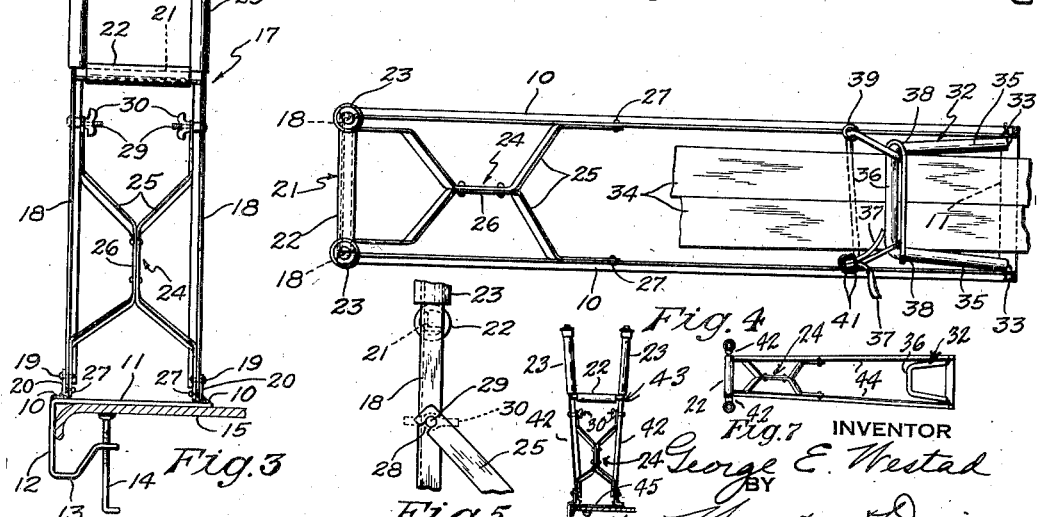
Fig. 3    Fig. 4
Fig. 5    Fig. 6    Fig. 7
INVENTOR
George E. Westad
BY
Wooster & Davis
ATTORNEYS.

Patented Mar. 25, 1941

2,236,025

UNITED STATES PATENT OFFICE 2,236,025

CARRIER FOR SKIS AND SIMILAR ARTICLES

George E. Westad, Scotia, N. Y.

Application December 14, 1938, Serial No. 245,612

2 Claims. (Cl. 224—29)

This invention relates to a carrier for skis and similar articles, particularly such a carrier as is adapted to be mounted on the running board of an automobile. It has for an object to provide such a carrier of strong, simple construction which can be manufactured at relatively low cost and will effectively hold skis and similar articles for easy transportation to and from a place of use.

It is also an object to provide such a carrier that will support and carry such article without scratching or otherwise injuring the car and without injury to the articles themselves, and also such a device so constructed and arranged that the skis or other articles to be carried can be easily and quickly placed in or removed from the carrier and can be securely fastened and held by the carrier.

Another object is to provide such a carrier which when not in use can be folded into a small space or into a flat package on the surface of the running board and requires only a small space for transportation or shipment.

With the foregoing and other objects in view I have devised a construction, a preferred form of which is shown in the accompanying drawing forming a part of this specification. It will, however, be understood that various changes and modifications may be employed within the scope of the invention.

In the drawing:

Fig. 1 is a perspective view showing the device in position on the running board of an automobile and showing a pair of skis secured in the carrier;

Fig. 2 is a side elevation showing the carrier folded down in position when not being used as a carrier;

Fig. 3 is a transverse section substantially on line 3—3 of Fig. 1 but with the skis removed;

Fig. 4 is a top plan view of the carrier with parts of the articles being carried broken away;

Fig. 5 is a detail side elevation showing the means of detachably connecting the brace to the upright support;

Fig. 6 is a view showing a slight modification of the upright support at the front of the frame; and Fig. 7 is a plan view of the modified frame used with the upright support of Fig. 6.

Due to their shape and length it is often quite difficult to effectively carry such articles as skis, a few pieces of lumber, pipes, fishing poles, and similar articles in pleasure motor vehicles. The present device may be easily and quickly clamped to a running board of such a vehicle and effectively supports such articles in a manner so that they will not scratch the vehicle or themselves be injured, and they may be easily and quickly placed in and removed from the carrier.

This improved carrier comprises a base or frame including longitudinal side members 10, which preferably are of angle iron sections as this gives a strong, lightweight construction, connected at their ends by transverse members 11 which are also extended downwardly at 12 and inwardly at 13 where they carry clamping members 14 threaded into the extensions 13. Members 10 and 11 are secured together by any suitable means such for example as spot welding. This frame 10 and 11 is adapted to rest on the top of the running board 15 of the motor car 16 and these extensions 13 extend under this board so that the clamps 14 may be set to clamp the frame to the board.

At one end there is pivoted to this frame a support 17 comprising upright side members 18, also preferably of angle sections, and pivoted to the base frame at 19 either directly to the side members 10 or on lugs 20 secured thereto as by welding or other suitable means. Extending between these side members and secured thereto is a cross bar 21, and this is spaced from the upper or free ends of the side members 18 as shown so that when one or more articles to be carried are resting on this cross member the side members 18 will extend above the same to retain them on this cross member. In order to protect the article being carried from injury this cross member may be covered with a rubber or similar covering 22, such for example as a rubber tubing, and the side members 18 above this cross member may be similarly protected by covering 23. This support 17 when not in use may be folded about the pivots 19 down on to the base frame as indicated in Fig. 2. It is retained in the upright position by an inclined bracket or brace 24. This may be of any suitable construction, but in the present case comprises two side members or bars 25 separated in suitable spaced relation at their opposite ends and bent toward each other and secured together at their mid-portion as indicated at 26 to provide a substantially X brace which is thus strong and rigid. This brace is pivoted at the lower ends of the members 25 to the side members 10 of the frame as indicated at 27, and have means at their opposite ends for detachably securing them to the side members 18 to hold the support 17 in the upright position. In the present case the side members 25 are each provided with a notch 28 adapted to seat over a bolt 29 extending inwardly from each of the side members 18 and having thumb nuts 30 to secure the brace 24 to the members 18. By loosening the nuts 30 the brace 24 and the support 17 may be folded down against the brace frame 10 as shown in Fig. 2 and secured thereto by any suitable means, such as a strap 31. The bolts 29 extend inwardly from the side members 18 toward each other so that they are out of the way and cannot scratch the car or catch on other articles.

At the opposite end of the base frame from the support 17 is a pivoted clamp 32. This is preferably of substantially inverted U shape with the free ends of the side members pivoted to the side members 10 at 33. This can lie down against the base frame when the carrier is not in use as shown in Fig. 2, but when articles are being carried it is raised from the base frame and the articles being carried, such as the skis 34 in Fig. 1, extend through this clamp between the side members 35 and under the cross bar 36. As the clamp 32 is pivoted the cross bar 36 may be raised or lowered to accommodate any number of articles that may be inserted through the clamp so that this bar can rest on the top of these articles. It may be clamped down on the articles by any suitable securing or clamping means connected to the side members 10. In the present case a rawhide or similar strap 37 is secured to the clamp 32 by looping it about the same as indicated at 38 and passing the free end portions through rings 39 secured to the side members 10. This strap may be drawn up through these rings to clamp the cross bar 36 securely against the articles, which action will also clamp the lower ends 40 of the articles against the top of the running board and will also clamp the upper end portions against the cross supporting bar 21.

It will thus be seen the articles are securely clamped in the carrying position where they will not work loose or fall out, and the clamp 32 is readily adjustable for any number or sizes of articles. Various means may be used for fastening the flexible member 37, a very effective means being a pair of rings 41 secured to one of the rings 39 and through which the free ends of the member 37 may be threaded and in such a manner as to effectively hold them against coming loose until loosened by the user. If preferred another suitable strap or flexible securing means may be used to secure the articles against the cross member 21. In order to prevent scratching or injury to the articles being carried the side arms and cross bar of the clamp 32 are covered with any suitable material such for example as rubber tubing.

In Figs. 6 and 7 is shown a slight modification which makes the device more rigid, particularly the upright support, and also gives more room for the articles to be carried. It also gives a somewhat better appearance. In this arrangement the upright side members 42 of the forward upright support 43 and corresponding to the upright side members 18, are inclined laterally outward from their lower to their upper ends. This brings their lower ends inwardly or closer together while their upper ends are farther apart giving more room between the upper rubber covered portions 23 and the cross bar 22 for insertion and removal of the articles and also greater carrying capacity. It also makes this upright support more rigid as the members are better braced. The side members of the base frame are also relatively inclined to bring their forward ends nearer together to correspond with the lower end arrangement of the members 42. Except for shortening the forward cross member 45 connecting the members 44 the device is not otherwise changed.

It will be seen that this carrier is of very simple construction which can be quickly mounted on the running board or removed therefrom, that it is readily foldable into very small space for storage and transportation, and can be very easily set up to the carrying position, that one or more articles, such as skis, or similar articles, may be readily and quickly placed in the carrier and secured therein so that there is no danger of their falling out during transportation, and that the clamping means readily adjusts itself to accommodate different sizes and numbers of these articles being carried. After arriving at his destination the user may readily and easily remove the articles for use.

Having thus set forth the nature of my invention, what I claim is:

1. A carrier for skis and similar articles comprising a frame adapted to rest on the running board of a motor car, clamps secured to the frame for fastening it to the running board, a support pivoted at the front end of the frame and having spaced uprights and a cross bar extending between the uprights below the upper ends thereof to support the articles between the uprights, a brace for said support pivoted to the frame and detachably connected to the support, an inverted U-shaped clamp having the free ends of its legs pivoted at the other end of the frame so that its cross bar can lie over the butt ends of the articles, and securing means connected to the clamp and the frame to clamp said cross bar to the articles to secure their butt ends and hold their forward end portions in the upright support.

2. A carrier for skis and similar articles comprising a frame adapted to rest on a running board of a motor vehicle, said frame comprising spaced angle iron side members, cross bars connecting said side members at the ends thereof and extended around under the outer edge of the running board and carrying clamping means to secure them to the board, a support pivoted at one end of said side members and movable between an upright position and a position substantially in the plane of the frame, said support comprising side members and a cross member extending between the side members at a distance from their free ends, a brace pivoted at one end to the frame and at the other end having means for detachably securing it to the support, an inverted substantially U-shaped clamp having the free ends of its legs pivoted to the frame adjacent its other end and with its cross bar adapted to lie over articles resting on said cross member of the support, and a flexible securing means connected to the frame and adapted to secure the clamp against said articles to secure their butt ends and hold their forward end portions on the cross member of the support.

GEORGE E. WESTAD.